Nov. 6, 1951     C. P. DAHL     2,574,022
FILLING AND DRAINING ATTACHMENT FOR TANKS

Filed Dec. 13, 1948     4 Sheets-Sheet 1

INVENTOR.
Carl P. Dahl,
BY
Mason, Porter, Diller & Stewart
attys.

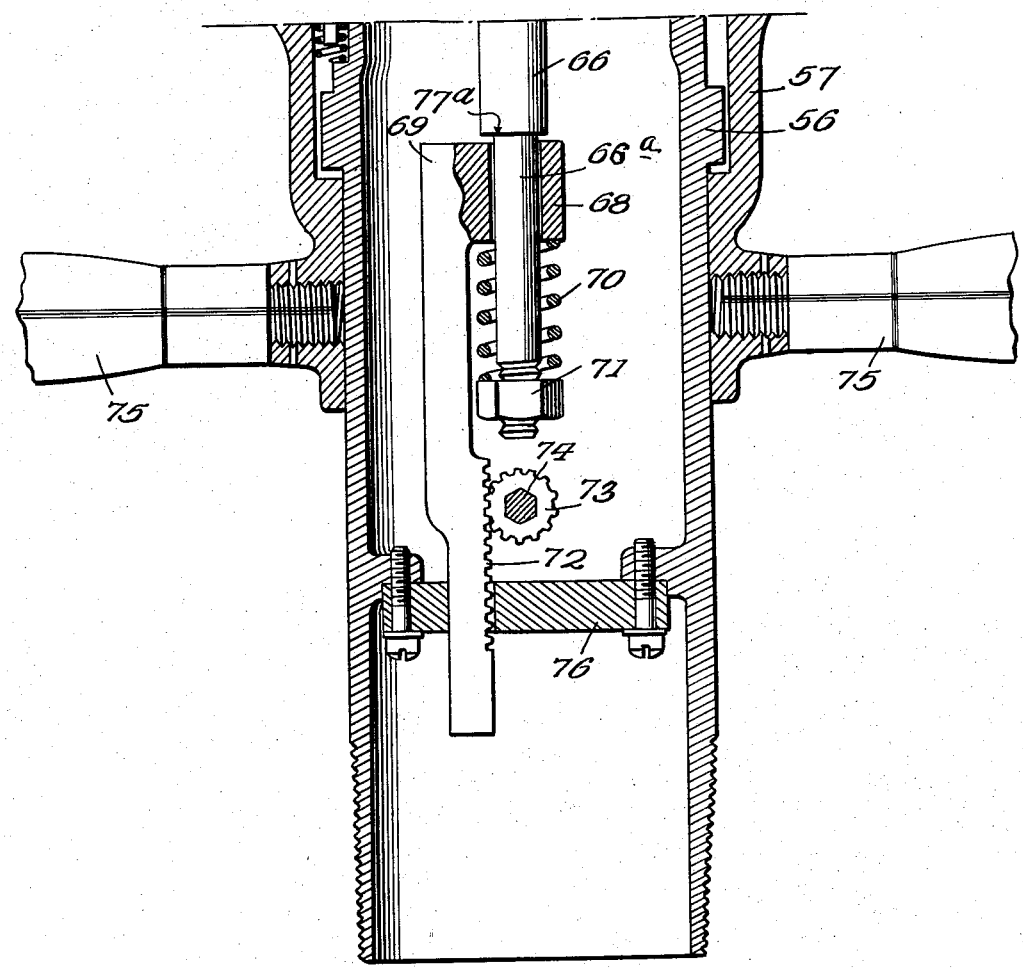

Nov. 6, 1951 C. P. DAHL 2,574,022
FILLING AND DRAINING ATTACHMENT FOR TANKS
Filed Dec. 13, 1948 4 Sheets-Sheet 3

INVENTOR.
Carl P. Dahl,
BY
Mason, Porter, Diller & Stewart
attys.

Nov. 6, 1951  C. P. DAHL  2,574,022
FILLING AND DRAINING ATTACHMENT FOR TANKS
Filed Dec. 13, 1948  4 Sheets-Sheet 4
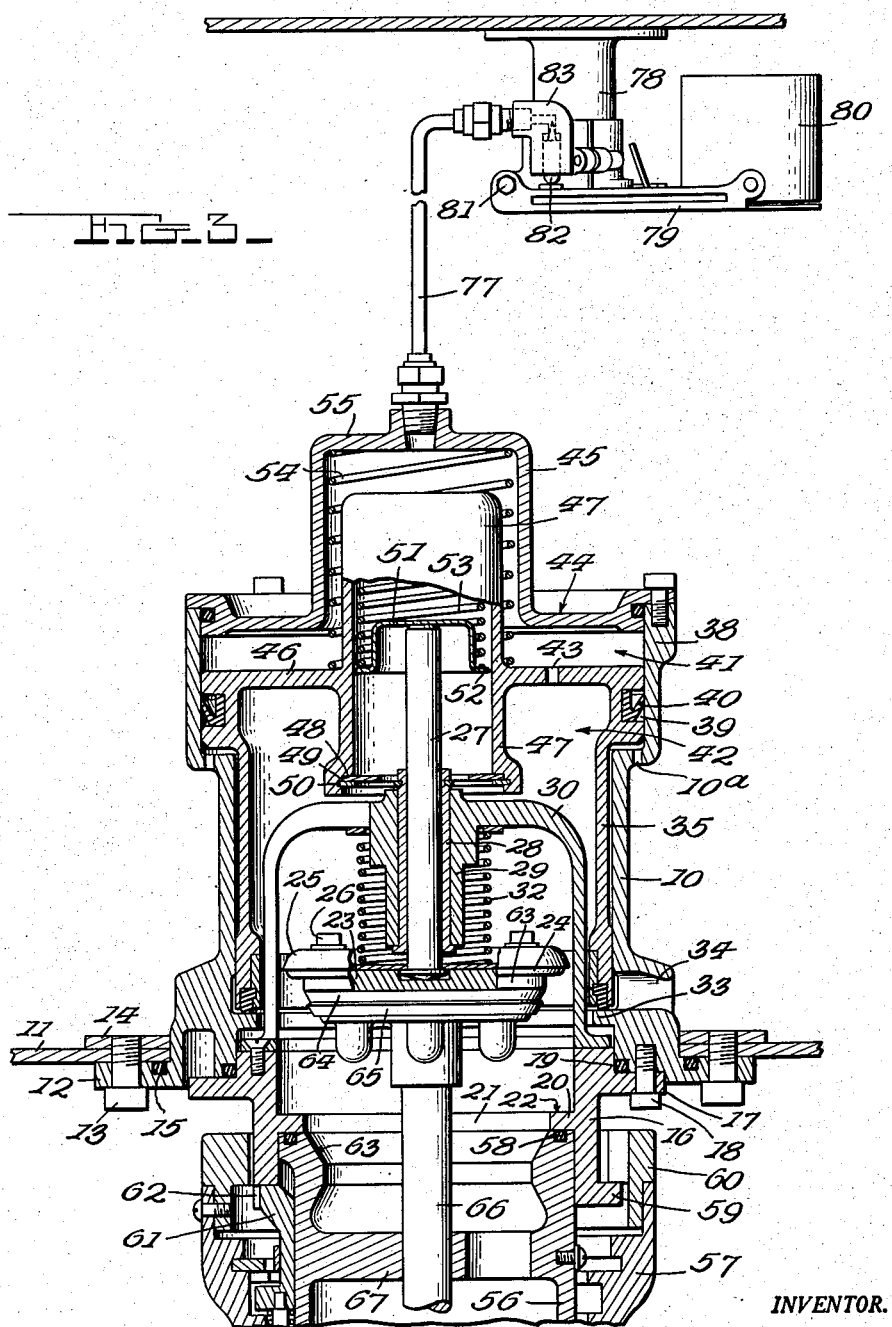
INVENTOR.
Carl P. Dahl,
BY
Mason, Porter, Diller & Stewart
attys.

Patented Nov. 6, 1951

2,574,022

UNITED STATES PATENT OFFICE 2,574,022

FILLING AND DRAINING ATTACHMENT FOR TANKS

Carl P. Dahl, Euclid, Ohio, assignor to The Parker Appliance Company, Cleveland, Ohio, a corporation of Ohio Application December 13, 1948, Serial No. 65,053

19 Claims. (Cl. 137—68)

The invention relates to new and useful improvements in an attachment for tanks for filling or emptying and draining the same.

An object of the invention is to provide an attachment of the above type, which includes a housing having a poppet valve controlled inlet and outlet opening, ports leading from the housing to the tank, a fluid pressure controlled valve for closing said ports, when the tank is filled to a predetermined level and manually controlled devices for opening said valves for emptying and draining said tank.

A further object of the invention is to provide an attachment of the above type, wherein the poppet valve is provided with means which, when the poppet valve is opened, contacts with and opens the fluid pressure controlled valve.

A still further object of the invention is to provide the means, whereby the poppet valve opens the fluid pressure controlled valve, with an actuating spring so positioned that the last-named valve may be closed when the poppet valve is still open.

These and other objects will be in part obvious and will be in part hereinafter more fully disclosed.

In the drawings:

Figure 1a is a view showing in vertical section the rest of the nozzle, only a portion of which is shown in Figure 1;

Figure 3 is a view similar to Figure 2 with the added feature of the float control and with the fluid pressure valve closed for stopping the flow of fluid to the tank when it is filled.

Figure 1:
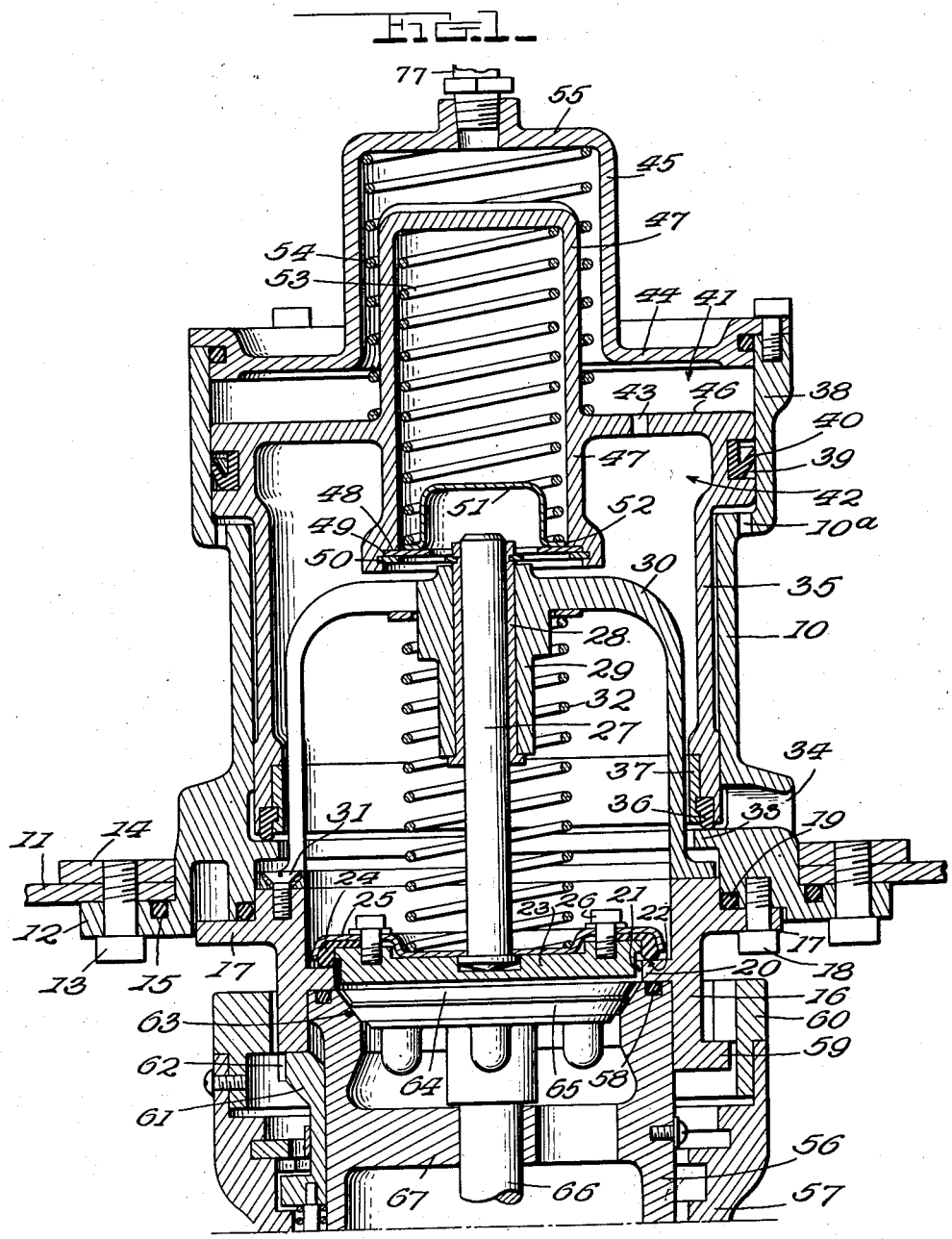
Figure 1 is a vertical sectional view through a housing adapted to be attached to the fuel tank and also showing a portion of the nozzle attached to the housing, the valves being in closed position.

The improvements have to do with an attachment for filling, emptying and draining a fuel tank, which is particularly adapted for use in aircraft, and the refueling of the tank from the underside thereof. The attachment includes a housing which is adapted to be fixedly connected to a wall of the tank. The housing is preferably disposed within a tank and connected to the bottom wall thereof. The housing has an opening at the lower side thereof which is surrounded by a valve seat and an inwardly opening poppet valve is normally spring pressed against the seat for closing the same. The poppet valve is mounted on a stem which reciprocates in a spider disposed within and secured to the housing. At a short distance above the valve seat surrounding the opening in the lower end of the housing is a second valve seat, and just above this second valve seat is a port leading from the housing to the tank. These ports are controlled by a cylindrical valve mounted in the housing, which valve is free to move in the housing to uncover or to close the ports. There is a spring for moving the valve towards closed position. There is a sealing gasket between the valve and the inner wall of the housing disposed above the ports in the housing which lead to the tank and this sealing gasket divides the housing into upper and lower chambers. There is an opening through the valve leading to the upper chamber so that the valve may be opened by fluid pressure and closed by fluid pressure when the tank is filled to a predetermined level.

There is means for attaching the nozzle to the housing in alignment with the opening in the bottom portion of the housing so that the tank may be filled or emptied and drained through this opening when the nozzle is attached thereto. There is a control valve in the nozzle and mechanical means for opening and closing the same. This nozzle valve is adapted to move the poppet valve to open position for the filling of the tank or for the emptying of the tank. To this end there is a yielding means between the stem of the poppet valve and the upper end of the cylindrical valve so that said cylindrical valve can be moved by fluid pressure to closed position while the poppet valve is still held open.

Referring more in detail to the drawings, the improved attachment for filling, emptying and draining a tank includes a housing indicated at 10 in the drawings. This housing is secured to the bottom wall 11 of the tank. The bottom wall has an opening therethrough and the housing extends through the opening and the greater part thereof is located in the tank. At the lower end of the housing is a laterally projecting flange 12 which engages the underside of the bottom wall of the tank. The housing is secured to the tank by bolts 13 which pass through the flange and are threaded into a clamping ring 14 on the inside of the tank. There is a sealing gasket 15 which seals the connection between the housing and the wall of the tank.

A sleeve 16 is attached to the lower end of the housing and forms a part thereof. Said sleeve has a projecting flange 17 and this flange is secured by bolts 18 to the lower end of the housing. There is a sealing gasket 19 which makes the connection between the sleeve and the housing fluid tight.

Said sleeve has an inwardly projecting ledge 20 having an opening 21 therethrough and this opening is for the purpose of filling the tank or emptying and draining the tank. The upper side of the ledge 20 provides a valve seat 22 which surrounds this opening 21. A poppet valve 23 carries a ring gasket 24 which is adapted to engage the valve seat 22 for closing the opening 21. This ring gasket 24 is secured to the poppet valve by means of a plate 25 and bolts 26. This plate 25 also serves as a means for attaching a valve stem 27 to the poppet valve. The valve stem 27 is free to reciprocate in a bushing 28 mounted in a depending sleeve 29 formed as a part of a supporting spider 30. The arms of this supporting spider rest on the upper end of the sleeve 16 and are secured thereto by screws 31.

There is a spring 32 disposed between the spider and the poppet valve and this spring moves the valve to closed position. The housing at a short distance above the sleeve 16 is provided with an inwardly projecting ledge 33 and the upper face of this ledge provides a valve seat. Just above or in a line with the valve seat are ports 34 which lead to the tank above the bottom wall 11. The tank is filled with fuel through these ports 34 and it may be also emptied and drained through these ports.

Mounted in the housing is a cylindrical valve 35. Said valve carries a gasket 36 which is attached to the lower end thereof by a sleeve 37. This gasket engages the valve seat when the cylindrical valve is lowered for the closing of the opening. The housing has an offset cylindrical portion 38 adjacent the upper end thereof and the cylindrical valve 35 is provided with a projecting portion having a recess 39 in which is located a gasket 40 that contacts with the wall of the housing and makes a tight fluid seal so that the housing is separated into an upper chamber 41 and a lower chamber 42.

There is a passage 43 connecting this lower chamber with the upper chamber so that fluid passing into the lower chamber may pass through this passage 43 into the upper chamber.

The upper end of the housing is closed by a closure head 44 having integral upwardly extending portion 45. The upper end 46 of the cylinder is provided with an integral cylindrical portion 47 which extends downwardly a short distance into the chamber 42 and extends upwardly into the portion 45 of the closure head 44. The upper end of this portion 47 is closed.

At the lower end of this portion 47 of the cylindrical head there is a shoulder 48 against which a plate 49 is firmly secured by means of a locking ring 50. Within this portion 47 of the cylindrical head is a cap 51 provided with a flange 52. The flange of this cap rests on the plate 49. A spring 53 bears at its upper end against the closed end of the cylindrical portion 47 and at its lower end the spring bears against the flange of the cap 51. This spring tends to move the cap 51 toward the plate 48.

There is another spring 54 which surrounds the cylindrical portion 47. This spring bears against the upper closed end 55 of the portion 45 and at its lower end it bears against the head of the cylindrical valve. This spring tends to move the cylindrical valve to closed position with the sealing gasket 36 carried thereby in sealing engagement with the upper seat 33 and thus closing the ports 34.

Figure 2:
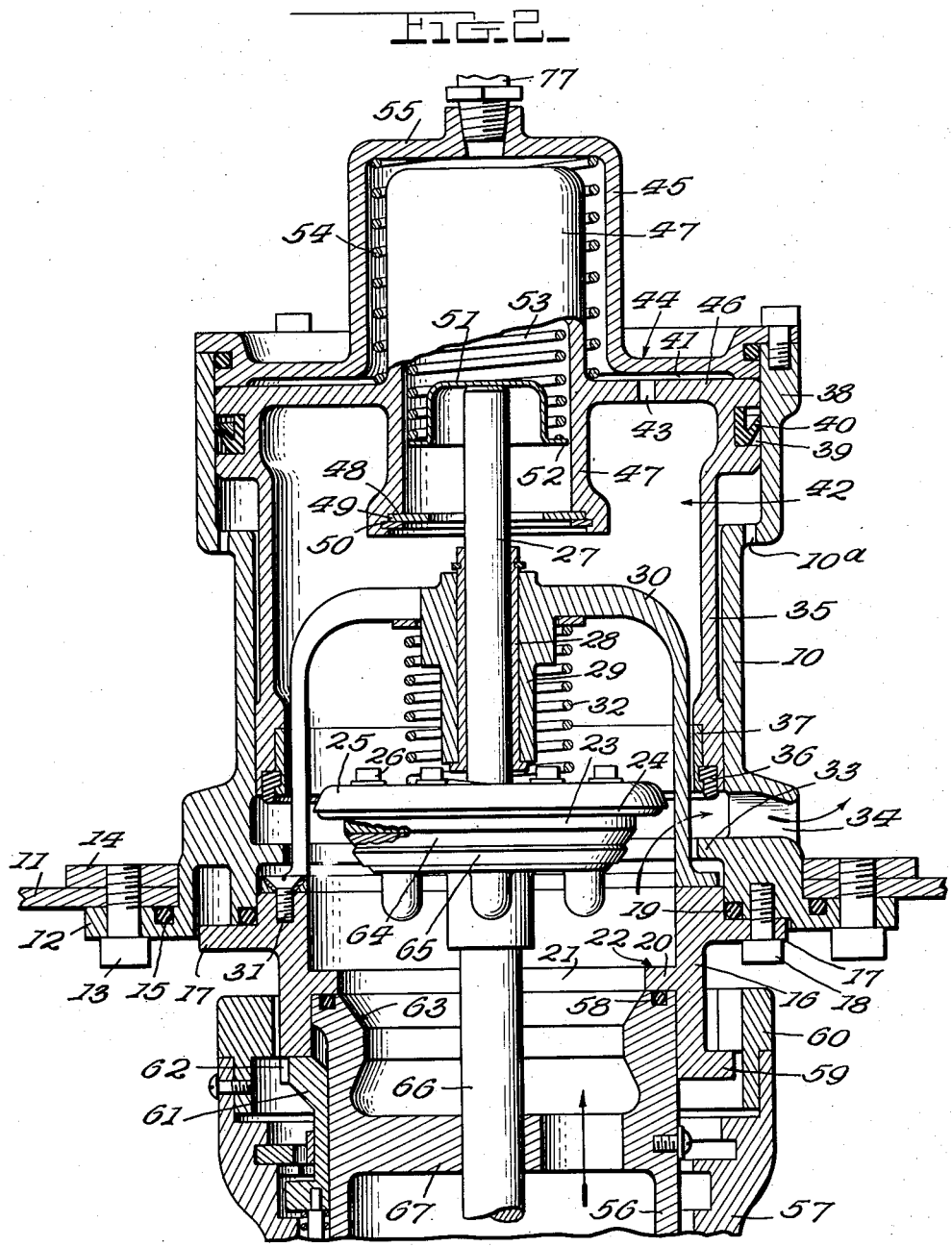
Figure 2 is a view similar to Figure 1, but showing the valves in position for the filling of the tank.

A nozzle shown in part in Figures 1, 2 and 3 and in part in Figure 1ᵃ is adapted to be attached to the sleeve 16 forming the lower part of the housing. The nozzle includes an inner sleeve member 56 and an outer sleeve coupling part 57. The inner sleeve member 56 is inserted in the sleeve 16 and the end of the inner sleeve contacts with the ledge 20. There is a gasket 58 which makes a fluid tight seal between the nozzle and the housing.

The sleeve 16 has laterally projecting lugs 59. The locking sleeve 57 is provided at its upper end with a holding ring 60 having slots through which the lugs 59 pass, after which, by turning of the locking sleeve 57 the nozzle will be tightly connected to the housing. There are spring pressed lugs 61 adapted to engage recesses or notches 62 in the sleeve 16, which prevent the inner member of the nozzle from turning when it is attached to the housing.

This means of attaching the nozzle to the housing forms no part of the present invention, but is shown, described and claimed in the copending application of Robert H. Davies, Ser. No. 754,302, filed June 12, 1947, now Patent No. 2,519,358 of August 22, 1950. The inner sleeve member of the nozzle is provided with a valve seat 63. Mounted in the nozzle is a valve 64 having a gasket 65 which is adapted to engage the valve seat 63 for tightly closing the nozzle. This valve 64 is carried by a shaft 66 mounted in a ported partition 67 for reciprocation. The shaft 66 has a reduced portion 66ᵃ. (See Fig. 1ᵃ.) Mounted on the reduced portion is a collar 68 formed as a part of a rack bar 69. A spring 70 is disposed between the collar 68 and the nut 71 threaded onto the lower end of the reduced portion 66ᵃ.

The rack bar 69 is provided with gear teeth 72 which mesh with a gear 73 carried by a shaft 74. The rack bar extends through a partition plate 76 and is guided therein and held in mesh with the gear wheel 73. Any suitable mechanical means may be provided for rotating a shaft 74 such as a hand crank. The sleeve 57 which couples the nozzle member to the housing is provided with laterally projecting handles 75, 75, which are used for placing the nozzle and turning the locking sleeve for joining the nozzle to the housing. The means for turning the sleeve and also for the opening and closing of the valve is not claimed herein, but is shown and claimed in the copending application supra.

This is a pipe 77 which extends from the upper end of the housing to a point adjacent the top of the tank. Mounted on a bracket 78 is a lever 79 carrying a float 80 and the lever is pivoted at 81 and is adapted to raise a needle valve 82 in order to close the opening in the elbow housing 83 at the upper end of the pipe 77. When the fluid in the tank is below a predetermined level the float 80 drops and releases the needle valve 82 so that it moves to open position. When it is desired to fill the tank the nozzle is attached to the tank in the manner described above. The valve 64 within the nozzle is closed when the nozzle is attached to the tank. Sometimes the pipe carrying the nozzle is attached to a fluid supply which is under pressure, in which case the valve, in closed position, prevents any leaking of the fluid from the nozzle. Then again the pipe associated with the nozzle may be connected with the fluid supply so controlled that there is no pressure on the nozzle when it is attached to the tank. In which case it may be desired to open the nozzle valve before the fluid under pressure is admitted to the pipe leading to the nozzle.

In order to fill the tank after the nozzle is attached, the shaft 74 is turned in a clockwise direction and this will raise the rack bar 69, bringing the collar 68 into contact with the shoulder 77ª of the shaft 66 which carries the valve 64. The raising of the valve 64 will bring it into contact with the poppet valve 23 and move said poppet valve off from its seat.

In Figure 1 of the drawings, the nozzle is shown attached ready for the opening of the valves.

In Figure 2, the poppet valve is moved to a position so that it engages the valve 63 and moves it to its extreme upper limit. If there is fluid under pressure in the nozzle when the valve 64 is open it will flow past the poppet valve and into the chamber 42. The fluid will contact with the underside of the head of the cylindrical valve 35 and this will move the cylindrical valve so as to open the ports 34 and the fluid will freely flow from the housing into the tank. However, the ports 34, or if preferred, the opening between the valve 35 and its seat 33 when the valve is open, is made with a somewhat smaller total cross-sectional area than the opening past the valve seat 22 when the poppet valve 23 is open and therefore fluid can enter the housing unit from the nozzle faster than it can pass into the tank. This results in a building up of pressure in the chamber 42 which tends to keep the cylindrical valve 35 in its upward or open position.

If there is no fluid under pressure in the nozzle when the valve 64 is open then the lifting of the poppet valve 23 by the opening of the valve 64 will cause the stem 27 of the poppet valve to engage the cap 51. The spring 53 has a greater rate than the spring 54 and, therefore, the cylindrical valve 35 will be raised without any appreciable collapsing of the spring 53 until the valve 35 reaches its fully raised position. In other words, if there is no fluid pressure on the line when the valve in the nozzle is open the opening of this valve moves the poppet valve away from its seat and also moves the cylindrical valve so as to open the ports and when the fluid pressure is then turned on it will pass into the housing and from the housing into the tank.

Since the fluid within the chamber 42 is under pressure, it passes through the opening 43 in the head of the cylindrical valve, filling the upper chamber 41 and flowing upwardly through the pipe 77 and past the needle valve 82 to the interior of the tank. The needle valve is open while the tank is being filled since the float 80 is in its lower position. The passage through the pipe 77 and needle valve 82 is relatively larger than the opening 43 whereby the fluid may pass from the chamber 41 more quickly than it can enter through the passage 43. This results in a lower pressure for the fluid within the chamber 41 than that in the chamber 42, the differential in the pressures tending to keep the valve 35 in the open position.

When, however, the float is raised to a predetermined position it will close the needle valve so that no further fluid in the pipe can pass therethrough. This will cause the pressure in the chamber 41 to be equalized with the pressure in the chamber 42. The upper side of the head of the cylindrical valve is of greater area than the underside and, therefore, there is a differential in the total pressures acting on the opposite sides of the cylindrical valve 35 which is brought about by the closing of the needle valve. This differential in pressure is effective for moving the cylindrical valve 35 to its closed position against the seat 33.

There are openings 10ª in the housing just below the head of the cylindrical valve. The lower end of the cylindrical valve is a guide fit with the inner surface of the housing 10. Any fluid trapped between the cylindrical valve and the housing will flow out through these openings 10ª and this permits the cylindrical valve to move to closed position under the differential pressure referred to above. When the valve 64 was moved to full open position, the spring 53 was partially collapsed. Movement of the valve 35 to closed position by action of differential fluid pressure overcomes the spring 53 still farther so that it will be further collapsed as shown in Fig. 3. While this cylindrical valve 35 may be forced to open position by the pressure of fluid within the chamber 42, it is mechanically connected to the poppet valve 23 by means of the spring 53. The spring 53 is stronger than the spring 54 and therefore will lift the cylindrical valve 35 off its seat upon opening of the poppet valve even though there is no fluid pressure within the housing. However, presence of dominating fluid pressure within the chamber 41 will close the cylindrical valve against the action of the spring 53 even though the poppet and nozzle valves remain open.

After the tank has been filled to a predetermined level, a further filling is automatically stopped by the closing of the cylindrical valve 35. The nozzle valve 64 may then be moved manually to closed position, and as it moves to closed position the poppet valve will likewise move to closed position. When these two valves are closed then the nozzle can be disconnected.

When the tank is to be emptied, the nozzle is connected to the tank in the manner described above. The pipe associated with the nozzle is, of course, free from any liquid under pressure and is connected to a tank into which the fluid is to be emptied and drained from the main tank. The operator then turns the shaft 74 and moves the valve 64 to full open position. This will cause the poppet valve to be moved to full open position and the poppet valve stem contacting with the cap 51 will move the cylindrical valve 35 to full open position. When the valves are all open the fluid will flow from the tank into the nozzle and thus the tank may be emptied either partially or fully and may be drained through the ports 34 which are the same ports through which the tank was filled.

It will be noted from Fig. 1 that there is a space between the upper end of the stem 27 and the opposed surface on the cap member 51 when the poppet valve 23 is in the closed position. This space is provided for the purpose of permitting a difference in the distances through which the poppet valve 23 and the cylindrical valve 35 travel from their respective closed to open positions. It is normally desirable to have the poppet valve travel a considerable distance to reach its fully opened position. On the other hand, it is desirable from the standpoint of minimizing the bulk and weight of the housing member 10 to have the cylindrical valve 35 travel only a short distance. The initial space between the stem 27 and the cap 51 in effect provides a lost motion connection between the poppet valve 23 and the valve 35 and partially accommodates the difference in the opening travel. The remainder of the difference is accommodated by the partial collapsing of the spring 53 after the valve 35 has reached its fully open position and while the poppet valve is moving in the last portion of its opening travel.

Although but one specific form of the invention is illustrated in the drawings it is obvious that many changes may be made in the detail construction without departing from the subject matter of the present invention. For example, the valve 23 instead of being of the poppet type may be of other well known types. Thus for instance the packing 24 may be so arranged that it will seat upon a cylindrical surface rather than on the transverse face 22. Valves 65 and 35 may likewise be so arranged, or in any other equivalent manner.

Also, the nozzle for connecting to the tank valve unit of the present invention may be of a design other than the one specifically illustrated and may even be power operated rather than manually operated.

I claim:

1. A device for use in filling tanks comprising a housing adapted to be attached to the wall of a tank, said housing having an opening through which the tank may be filled or emptied, a first valve for controlling said opening, said housing having a port for connecting the interior of the housing with the interior of the tank, a fluid pressure controlled valve for automatically closing said port when the tank is filled to a predetermined level, said first valve being adapted to be opened by any suitable means exteriorly of the housing, said valves being disposed in said housing and movable in the same direction when opened and means connecting the two valves for opening the fluid pressure valve upon opening of the first valve.

2. A device for use in filling tanks comprising a housing adapted to be attached to the wall of a tank, said housing having an opening through which the tank may be filled or emptied, a first valve for controlling said opening, said housing having a port for connecting the interior of the housing with the interior of the tank, a fluid pressure controlled valve for automatically closing said port when the tank is filled to a predetermined level, said first valve being adapted to be opened by any suitable means exteriorly of the housing, and means connecting the two valves for opening the fluid pressure valve upon opening of the first valve, said means being yieldable for permitting the fluid pressure valve to be moved to closed position by fluid pressure while the first valve is still open.

3. A device for use in filling tanks comprising a housing adapted to be attached to the wall of a tank, said housing having an opening through which the tank may be filled or emptied, a first valve for controlling said opening, said housing having a port for connecting the interior of the housing with the interior of the tank, a fluid pressure controlled valve for automatically closing said port when the tank is filled to a predetermined level, said first valve being adapted to be opened by any suitable means exteriorly of the housing, a spring interposed between said valves for opening the fluid pressure valve upon opening of the first valve and yieldable to permit the fluid pressure valve to be moved to closed position by fluid pressure while the first valve is still open.

4. A device for use in filling tanks comprising a housing adapted to be attached to the wall of a tank, said housing having an opening through which the tank may be filled or emptied, a first valve for controlling said opening, said housing having a port for connecting the interior of the housing with the interior of the tank, a fluid pressure operated valve for automatically closing said port when the tank is filled to a predetermined level, a spring constantly urging said fluid pressure valve to closed position, said first valve being adapted to be opened by any suitable means exteriorly of the housing, a spring interposed between said valves for opening the fluid pressure valve against the action of the first mentioned spring upon opening of the first valve and yieldable to permit the fluid pressure valve to be moved to closed position by fluid pressure while the first valve is still open.

5. A device for use in filling tanks comprising a housing adapted to be attached to the wall of a tank, said housing having an opening through which the tank may be filled or emptied, a first valve for controlling said opening, said housing having a port for connecting the interior of the housing with the interior of the tank, a fluid pressure operated valve for automatically closing said port when the tank is filled to a predetermined level, a spring constantly urging said fluid pressure valve to closed position, said first valve being adapted to be opened by any suitable means exteriorly of the housing, a spring interposed between said valves for opening the fluid pressure valve against the action of the first mentioned spring upon opening of the first valve and yieldable to permit the fluid pressure valve to be moved to closed position by fluid pressure while the first valve is still open, said second mentioned spring having a greater rate than said first mentioned spring.

6. A device for use in filling tanks comprising a housing adapted to be attached to the wall of a tank, said housing having an opening through which a tank may be filled or emptied, a first valve for controlling said opening, said housing having a port for connecting the interior of the housing with the interior of the tank, a fluid pressure operated valve within said housing and having a portion dividing the housing into upper and lower chambers, said first valve being adapted to be opened by any suitable means exteriorly of the housing, said valves being disposed in said housing and movable in the same direction when opened means connecting the two valves for opening the fluid pressure valve upon opening of the first valve, said fluid pressure valve being responsive to a differential in the total fluid pressures within said chambers for closing said ports.

7. A device for use in filling tanks comprising a housing adapted to be attached to the wall of a tank, said housing having an opening through which a tank may be filled or emptied, a first valve for controlling said opening, said housing having a port for connecting the interior of the housing with the interior of the tank, a fluid pressure operated valve within said housing and having a portion dividing the housing into upper and lower chambers, means for admitting fluid into said chambers, said first valve being adapted to be opened by any suitable means exteriorly of the housing, means connecting the two valves for opening the fluid pressure valve upon opening of the first valve, unequal areas on said fluid pressure valve subject to the pressure of fluid within said chambers and effective when the unit pressures of fluids within said chambers are substantially equalized to cause said fluid pressure valve to move to closed position, means for maintaining unequalized unit fluid pressures in said chambers while the tank is being filled, and means responsive to a predetermined level of liquid within the tank for substantially equalizing the unit fluid pressures within said chambers.

8. A device for use in filling tanks comprising a housing adapted to be attached to the wall of a tank, said housing having an opening through which fluid under pressure may be admitted to the interior of said housing, a first valve for controlling said opening, said housing having a port for connecting the interior of the housing with the interior of the tank, a fluid pressure operated valve for controlling said port, said first valve being adapted to be opened by any suitable means exteriorly of the housing, yieldable means connecting the two valves for opening the fluid pressure valve upon opening of the first valve, said fluid pressure valve having an area subject to the pressure of fluid entering through said opening for urging said fluid pressure valve toward open position, and means for automatically causing fluid pressure valve to close said port when the tank has been filled to a predetermined level.

9. A device for use in filling tanks comprising a housing adapted to be attached to the wall of a tank, said housing having an opening through which fluid under pressure may be introduced into the interior of said housing, a first valve for controlling said opening, said housing having a port for connecting the interior of the housing with the interior of the tank, a fluid pressure operated valve for controlling said port, said first valve being adapted to be opened by any suitable means exteriorly of the housing, and means connecting the two valves for opening the fluid pressure valve upon opening of the first valve, a bleed passage connecting the interior of the housing with the interior of the tank, means effective when both said valves are open and the tank is being filled for forcing incoming fluid through said bleed passage, means for closing said bleed passage when the tank has been filled to a predetermined level, and means responsive to the closing of said bleed passage for causing the fluid pressure operated valve to close.

10. A device for use in filling tanks comprising a housing adapted to be attached to the wall of a tank, said housing having an opening through which fluid under pressure may be introduced into the interior of said housing, a first valve for controlling said opening, said housing having a port for connecting the interior of the housing with the interior of the tank, a fluid pressure operated valve for controlling said port, said first valve being adapted to be opened by any suitable means exteriorly of the housing, and means connecting the two valves for opening the fluid pressure valve upon opening of the first valve, a bleed passage connecting the interior of the housing with the interior of the tank, the passage for fluid through said fluid pressure valve controlled port being smaller than the passage through said opening when both valves are open whereby sufficient pressure will be maintained on the fluid within said housing for forcing it through said bleed passage, means for closing said bleed passage when the tank has been filled to a predetermined level, and means responsive to the closing of said bleed passage for causing the fluid pressure operated valve to close.

11. A device for use in filling tanks comprising a housing adapted to be attached to the wall of a tank, said housing having an opening through which the tank may be filled or emptied, a first valve for controlling said opening, said housing having a port for connecting the interior of the housing with the interior of the tank, a fluid pressure controlled valve for automatically closing said port when the tank is filled to a predetermined level, said first valve being adapted to be opened by any suitable means exteriorly of the housing, and means operable after the initial opening movement of said first valve for opening the fluid pressure valve upon further opening movement of the first valve.

12. A device for use in filling tanks comprising a housing adapted to be attached to the wall of a tank, said housing having an opening through which the tank may be filled or emptied, a first valve for controlling said opening, said housing having a port for connecting the interior of the housing with the interior of the tank, a fluid pressure controlled valve for automatically closing said port when the tank is filled to a predetermined level, said first valve being adapted to be opened by any suitable means exteriorly of the housing, and spring means interposed between said valves and effective after the initial opening movement of said first valve for opening the fluid pressure valve upon further opening movement of the first valve.

13. A device for use in filling or emptying tanks comprising a housing adapted to be attached to the wall of a tank, said housing having an opening through which the tank may be filled or emptied, a valve seat surrounding said opening, a normally closed poppet valve for said opening, said housing having a second seat disposed inwardly from said first valve seat, ports in the housing leading to the tank above said second named valve seat, a fluid pressure operated valve for automatically closing said ports when the tank is filled to a predetermined level, said poppet valve being adapted to be opened by any suitable means exteriorly of the housing, and said valves being disposed in said housing and movable in the same direction when opened means connecting the two valves for opening the fluid pressure valve upon opening of the poppet valve.

14. A device for use in filling or emptying a tank comprising a housing adapted to be attached to the wall of a tank, said housing having an opening through which the tank may be filled or emptied, a valve seat surrounding said opening, a spring closed poppet valve for said opening, said housing having a second seat disposed inwardly from said first valve seat, ports in the housing leading to the tank above said second named valve seat, a normally closed fluid pressure operated valve for automatically closing said ports when the tank is filled to a predetermined level, a spring disposed between the fluid pressure valve and the poppet valve, said poppet valve being adapted to be operated by any suitable means exteriorly of the housing, said spring operating to open the fluid pressure valve upon opening of the poppet valve and permitting the fluid pressure valve to be moved to closed position by fluid pressure while the poppet valve is still open.

15. A device for use in filling or emptying tanks comprising a housing adapted to be attached to the wall of a tank, said housing having an opening through which the tank may be filled or emptied, a valve seat surrounding said opening, a poppet valve for closing said opening, a stem fastened to said valve, a spider in said housing having a bearing in which said stem is mounted for reciprocation, a spring between the spider and the poppet valve for moving the same toward closed position, said housing having a second valve seat disposed inwardly from the first valve seat, ports in the housing leading to the tank above said second named valve seat, a fluid pressure operated valve for automatically closing said ports when the tank is filled to a predetermined level, spring means between the valve stem and the fluid pressure valve, said poppet valve being adapted to be opened by any suitable means exteriorly of the housing, the opening of said poppet valve causing said stem to engage said spring means for opening the fluid pressure valve, said spring means permitting the fluid pressure valve to close while the poppet valve remains in open position.

16. A device for use in filling or emptying the tank comprising a housing adapted to be attached to the wall of a tank, said housing having an opening through which the tank can be filled or emptied, a valve seat surrounding said opening, a poppet valve for closing said opening, a stem fastened to said poppet valve, a spider in said housing having a bearing in which said stem is mounted for reciprocation, a spring between the spider and the poppet valve for moving the same toward closed position, said housing having a second valve seat disposed inwardly from the first valve seat, ports in the housing leading to the tank above said second named valve seat, a fluid pressure operated valve for automatically closing said ports when the tank is filled to a predetermined level, said fluid pressure valve including an extension for housing a spring, a cap within said extension, a spring bearing on the cap at its lower end and on the housing extension at its upper end, said cap being in alignment with the stem of the poppet valve whereby when said poppet valve is opened the stem will engage the cap and through the spring move the fluid pressure valve to open position, a spring between the upper end of the housing and the fluid pressure valve tending to move said valve toward closed position, said last mentioned spring having a lower rate than the spring within said housing extension, said poppet valve being adapted to be opened by any suitable means exteriorly of the housing.

17. A device for use in filling or emptying tanks comprising a housing adapted to be attached to the wall of a tank, said housing having an opening through which the tank may be filled or emptied, a valve seat surrounding said opening, a spring closed poppet valve for said opening, said housing having a second valve seat disposed inwardly from said first valve seat, ports in the housing leading to the tank above said second-named valve seat for filling or emptying said tank, a cylindrical valve having a valve face at the lower end thereof adapted to engage said second valve seat for closing said ports, said cylindrical valve having an enlarged closure head at the upper end thereof, a gasket carried by said head and engaging the inside wall of the housing for dividing said housing into upper and lower chambers, said head having a relatively small opening connecting said chambers whereby fluid may pass from the lower chamber to the upper chamber, a pipe having fluid connection with said upper chamber and adapted to extend upwardly in a tank to a point adjacent the upper side thereof, a float controlled needle valve for closing an opening leading to said pipe when the fluid in the tank reaches a predetermined level, a spring disposed between said cylindrical valve and the poppet valve, said poppet valve being adapted to be opened by any suitable means exteriorly of the housing, said spring operating to open the cylindrical valve upon opening of the poppet valve and permitting said cylindrical valve to be moved by fluid pressure to closed position while the poppet valve is still open.

18. The combination of a housing adapted to be attached to the wall of a tank for filling or emptying the tank, said housing having an opening through which the tank may be filled or emptied, a poppet valve for controlling said opening, said housing having a port for connecting the interior of the housing with the interior of the tank, a fluid pressure operated valve for automatically closing said port when said tank is filled to a predetermined level, said valves being disposed in said housing and movable in the same direction when opened means connecting the two valves for opening the fluid pressure valve upon opening of the poppet valve, a nozzle adapted to be attached to the housing through which the tank may be filled or emptied, and means on said nozzle for opening said poppet valve.

19. The combination of a housing adapted to be attached to the wall of a tank for filling or emptying the tank, said housing having an opening through which the tank may be filled or emptied, a valve seat surrounding said opening, a spring closed poppet valve for said opening, said housing having a second valve seat disposed inwardly from said first valve seat, ports in the housing leading to the tank above said second-named valve seat for filling or emptying said tank, a fluid pressure operated valve for automatically closing said ports when the tank is filled to a predetermined level, a nozzle adapted to be attached to the tank for filling or emptying the same, a valve associated with the nozzle, manual means for opening the nozzle valve, said nozzle valve being disposed so that when moved to open position it will engage said poppet valve and through said spring open said fluid pressure valve, said spring permitting said fluid pressure valve to be moved to closed position by fluid pressure while said poppet valve is still open.

CARL P. DAHL.

REFERENCES CITED

The following references are of record in the file of this patent:

UNITED STATES PATENTS

| Number | Name | Date |
|---|---|---|
| 269,886 | Semple | Jan. 2, 1883 |
| 295,691 | Tobey | Mar. 25, 1884 |
| 506,145 | Young | Oct. 3, 1893 |
| 696,135 | Curtis | Mar. 25, 1902 |
| 703,805 | Murray | July 1, 1902 |
| 2,143,204 | McCormack | Jan. 10, 1939 |
| 2,211,237 | Langdon | Aug. 13, 1940 |
| 2,384,628 | Krone | Sept. 11, 1945 |

FOREIGN PATENTS

| Number | Country | Date |
|---|---|---|
| 347,338 | France | of 1905 |